(12) United States Patent
Rao et al.

(10) Patent No.: US 7,035,347 B2
(45) Date of Patent: Apr. 25, 2006

(54) COMBINING DIRECT INTERFERENCE ESTIMATION AND DECODER METRICS FOR IMPROVED MEASUREMENT FOR AMR MODE ADAPTATION IN GSM SYSTEMS

(75) Inventors: Prasada Rao, Apex, NC (US); Abhijit Patait, Santa Clara, CA (US)

(73) Assignee: Sony Ericsson Mobile Communications AB, Lund (SE)

( * ) Notice: Subject to any disclaimer, the term of this patent is extended or adjusted under 35 U.S.C. 154(b) by 695 days.

(21) Appl. No.: 10/065,724

(22) Filed: Nov. 13, 2002

(65) Prior Publication Data

US 2004/0203817 A1 Oct. 14, 2004

(51) Int. Cl.
*H04L 27/06* (2006.01)
*H04L 23/00* (2006.01)

(52) U.S. Cl. .................... 375/316; 375/341; 375/377

(58) Field of Classification Search ............... 375/316, 375/259, 346, 285, 262, 341, 265, 377; 714/794–796
See application file for complete search history.

(56) References Cited

U.S. PATENT DOCUMENTS

| | | | |
|---|---|---|---|
| 5,193,102 A * | 3/1993 | Meidan et al. | 375/132 |
| 5,450,453 A * | 9/1995 | Frank | 375/130 |
| 6,134,220 A | 10/2000 | LeStrat et al. | |
| 2002/0086371 A1* | 7/2002 | Kreutzer et al. | 435/115 |

FOREIGN PATENT DOCUMENTS

| | | |
|---|---|---|
| EP | 0689312 | 12/1995 |
| EP | 0944201 | 9/1999 |
| EP | 1052621 | 11/2000 |
| WO | WO 02/17531 | 2/2002 |

OTHER PUBLICATIONS

Pal Frenger, "Turbo Decoding on Raleigh Fading Channels with Noisy Channel Estimates," IEEE, 1999, pp. 884-888.*
Patent Abstracts of Japan, JP2000165359, (Jun. 16, 2000) Japan Radio Co., Ltd., vol. 2000, No. 09 (Oct. 13, 2000).
European Search Report Dated May 7, 2004, PCT/US03/31702, Sony Ericsson Mobile Communications AB.

* cited by examiner

*Primary Examiner*—Tesfaldet Bocure
(74) *Attorney, Agent, or Firm*—Moore & Van Allen PLLC; Gregory A. Stephens

(57) ABSTRACT

A method of combining a channel quality estimate for the radio channel based on direct measurement of carrier and interferer energies, and a channel quality estimate for the radio channel based on channel decoder metrics, to obtain a final channel quality estimate in terms of carrier-to-interference (C/I) ratio for the radio channel, which is more reliable, consistent and accurate than that obtained with the individual methods. After computing a direct channel quality estimate and a decoder metric-based channel quality estimate for the radio channel, confidence levels, P(direct), P (metric), are assigned to the two estimates. P(direct) is multiplied with the direct channel quality estimate and P(metric) is multiplied with the decoder metric channel quality estimate. The respective products are added to obtain the final channel quality estimate in terms of the carrier-to-interference (C/I) ratio for the radio channel.

14 Claims, 3 Drawing Sheets

FIG. 4
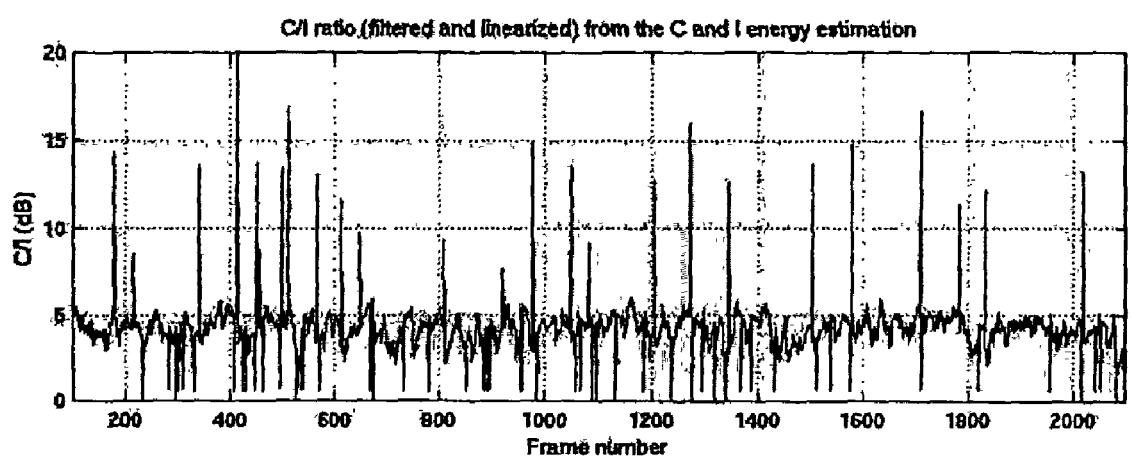
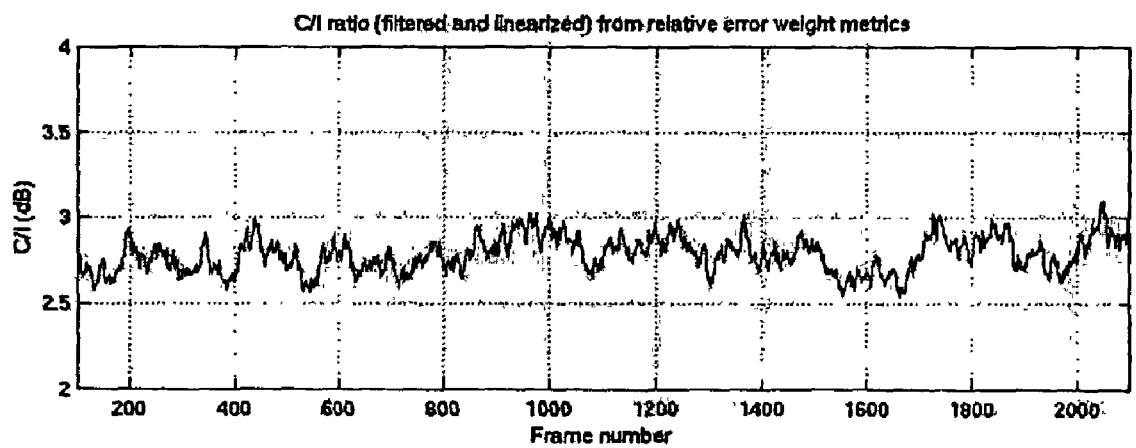
FIG. 5

COMBINING DIRECT INTERFERENCE ESTIMATION AND DECODER METRICS FOR IMPROVED MEASUREMENT FOR AMR MODE ADAPTATION IN GSM SYSTEMS

BACKGROUND OF INVENTION

FIG. 1 illustrates a prior art block diagram of a traditional implementation of a direct method for channel quality estimation based on carrier and interferer energy estimation. The received GSM burst samples are processed by a correlation and channel estimation block 10. The resulting channel estimate is used by the carrier energy (C) estimation block 12 and the interference energy (I) estimation block 14. The outputs of the (C) estimation block 12 and the (I) estimation block 14 are then fed to block 16. Block 16 computes the ratio of these two energies to generate a carrier-to-interference energy (C/I) estimate. This estimate is further linearized and filtered by block 18 to compute the final channel quality estimate.

This method is currently used in GSM mobile phones for implementing a mode adaptation algorithm for an adaptive multi-rate (AMR) vocoder. The carrier energy (C) and the interference energy (I) in each GSM burst are individually estimated and the ratio C/I (after linearization and filtering) is used as a measure of the channel quality.

This method works well in non-fading channel conditions with reasonably good channel quality (e.g., C/I>8 dB). However, for significantly degraded channels (e.g., C/I<8 dB), the variance of the C/I estimates is high even after linearization and filtering. High C/I estimate variances can result in misinterpretation of actual channel conditions leading the AMR vocoder to operate at a non-optimum speech rate. High variances can also result in undesirable rapid switching between adjacent vocoder rates. High variances in C/I estimates will degrade the overall performance of channel utilization and voice quality in the mobile phone.

To maximize voice quality and improve channel utilization in AMR capable GSM phones, it is necessary that the C/I estimates be reasonably reliable and accurate with minimum variance.

SUMMARY OF INVENTION

The present invention combines two approaches for channel quality estimation, direct estimation of C and I, and a channel decoder metric approach. The hybrid approach results in an improvement in the reliability and accuracy of channel quality estimates, especially for lower C/I ratio values, thereby avoiding false switching of AMR vocoder rates.

The present invention comprises a system and method for combining a direct channel quality estimate for a radio channel and a decoder metric-based channel quality estimate for the radio channel to obtain a better channel quality estimate, in terms of the carrier-to-interference (C/I) ratio for the radio channel. After obtaining a direct channel quality estimate and a decoder metric channel quality estimate for the radio channel, confidence levels, P(direct) and P(metric), are assigned to the direct channel quality estimate and the decoder metric-based channel quality estimate, respectively. The channel quality estimates from the two methods are then combined in proportion to their confidence levels to obtain the final channel quality estimate in terms of carrier-to-interference (C/I) measurement for the radio channel.

BRIEF DESCRIPTION OF DRAWINGS

FIG. 4 is a plot of C/I ratio for sample data using only the direct estimation method.

FIG. 5 is a plot of C/I ratio for the same sample data using the combined method of the present invention.

DETAILED DESCRIPTION

The adaptive multi-rate (AMR) speech codec is fundamentally different from fixed-rate speech codecs in that multiple speech rates are defined and the speech rate may be changed dynamically. For each speech rate, a channel coding scheme is defined and speech rate may be altered in order to match the channel coding to the link quality.

As an AMR enabled GSM mobile phone encounters poor channel conditions, e.g. at the edge of a cell or during a fade, the speech rate is reduced and the channel coding is increased. The reduced speech rate leads to a lower rate but still acceptable speech quality. This dynamic change is performed in a controlled manner such that the bit error rate (BER) into the speech decoder is always kept at acceptable levels to maintain overall good speech quality. With a fixed-rate speech codec under similar conditions, the BER into the speech decoder would quickly reach unacceptable levels leading to degraded speech quality out of the decoder. The active codec set (Full-rate or Half-rate) at any time comprises 1 to 4 AMR codec modes correlated to the speech rates that the codec can switch to, in response to the changes in the channel condition. There are 0 to 3 thresholds defined in terms of C/I ratios for switching between the 1 4 codec modes in the current active set.

With AMR usage becoming more widespread, it has become even more important to have reliable and accurate channel quality estimates so that AMR vocoder does not haphazardly switch among adjacent codec modes unnecessarily.

The present invention combines the direct method of channel quality estimation (FIG. 1) and a channel decoder metric-based method to improve the reliability and accuracy of the channel quality estimate in terms of the C/I ratio.

Figure 1:
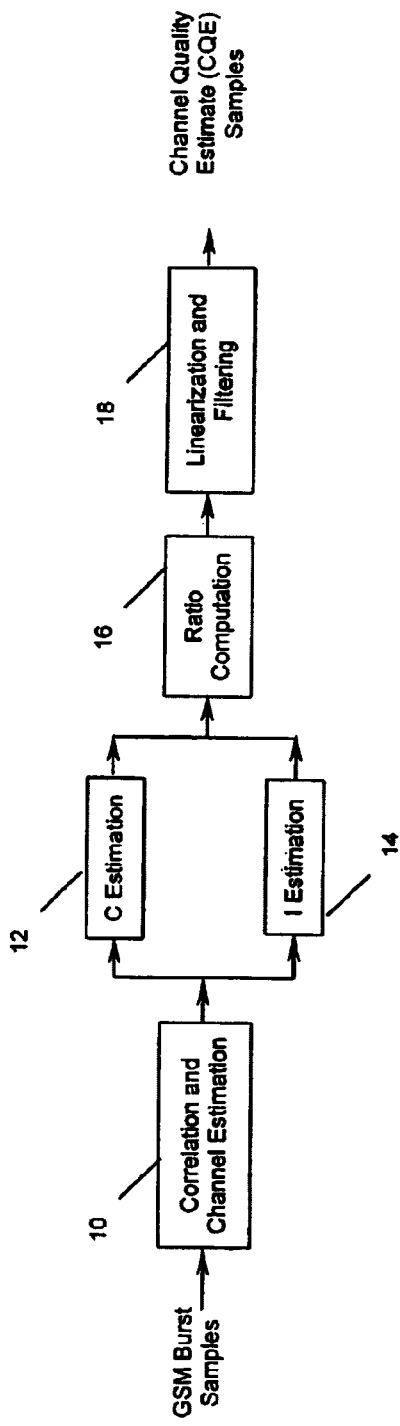
FIG. 1 is a block diagram illustrating a prior art channel quality estimation method using direct estimation of carrier and interferer energies.
Figure 2:
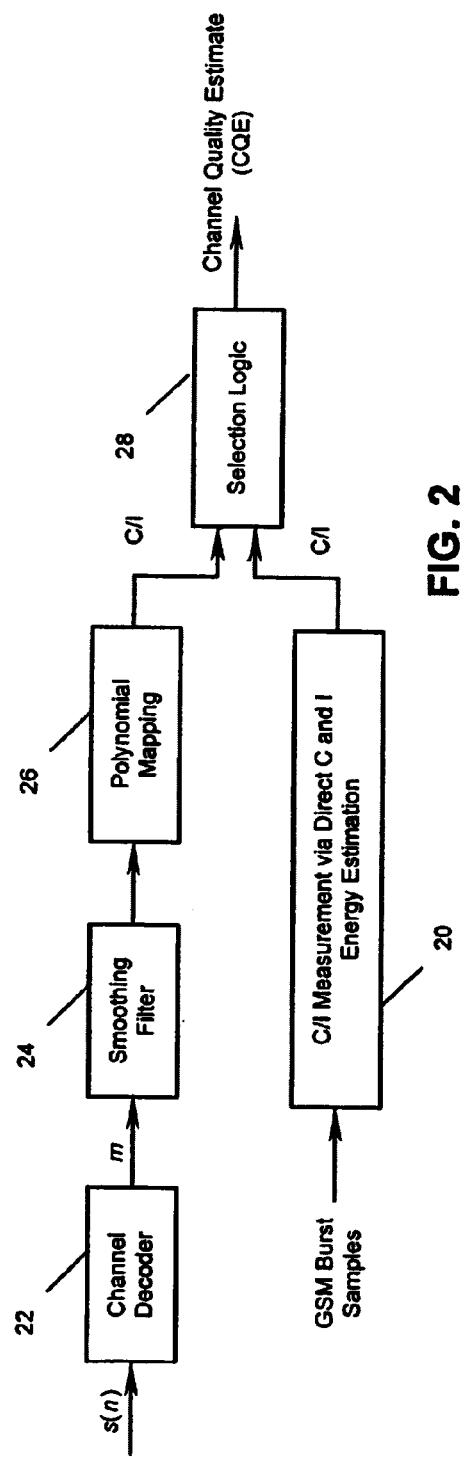
FIG. 2 is a block diagram illustrating the channel quality estimation method using combination of the direct estimation method and channel decoder metric-based methods.

FIG. 2 is a block diagram illustrating the channel quality estimation method of the present invention using a combination of direct estimation and decoder metric estimation methods. There are two paths for generating C/I estimates. One path is the direct estimation method described in FIG. 1 represented by block 20. The other path is a channel decoder metric-based estimation method.

The channel decoder metric used herein to estimate channel quality is given by:

$$m = \frac{\sum |s(n)| - r}{\sum |s(n)|} \quad (1)$$

where r is the final accumulated (correlation) metric at the last stage of the trellis of a Viterbi (convolutional) decoder 22, and s (n) represents the nth soft bit input into the Viterbi decoder 22. Other equivalent metrics can also be used without deviating from the concepts of the present invention.

The metric, m, defined by equation (1) is referred to as the relative error weight metric. It gives a measure of the difference between the accumulated metrics of paths taken by a convolutional encoder and a Viterbi decoder 22 through the trellis, normalized by the overall magnitude of the soft bits. On one hand, a lower magnitude of m implies that the path taken by the Viterbi decoder 22 deviated only for a few branches from the original path taken by the convolutional encoder through the trellis, and hence better channel quality. On the other hand, higher magnitude of m implies that the path taken by the Viterbi decoder 22 deviated from the correct path in several branches, thus indicating poor channel quality.

The relative error weight metrics of successive frames are filtered through a smoothing filter 24 to eliminate the instantaneous fluctuations. The smoothed metric values are then mapped to C/I ratio in dB using a mapping polynomial 26. The degree of the polynomial is dependent upon the range of interest and desired accuracy of the mapping. A third-degree polynomial is sufficient over the range of C/I ratios encountered in AMR mode adaptation.

The C/I estimates generated by both the direct estimation method and the decoder metric method are fed to a selection logic block 28. The selection logic block 28 assigns a confidence level to the C/I estimates from the two methods and computes a final C/I value to be used by the AMR mode adaptation module.

Figure 3:
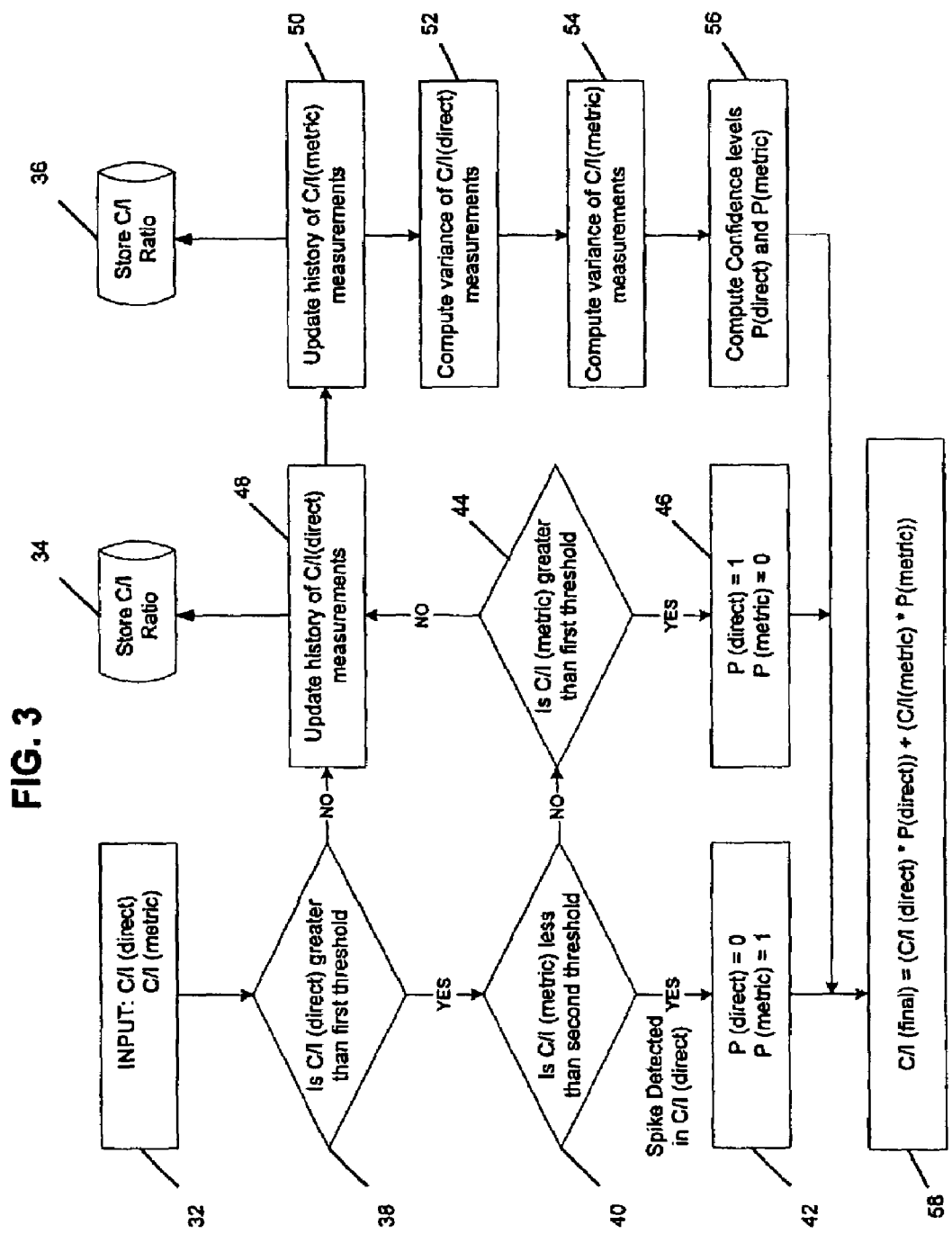
FIG. 3 is a flowchart illustrating the process for combining two channel quality estimation methods.

FIG. 3 is a flowchart illustrating the process for the selection logic block 28 shown in FIG. 2 that is used to selectively combine the C/I ratios from the two channel quality estimation methods. On one hand, the selection process will exclusively rely on the C/I estimate from the direct estimation method when the estimates from both methods are greater than a first threshold value. On the other hand, the selection process will exclusively rely on C/I estimate from the channel decoder metric-based method when the direct method estimate is greater than the first threshold value $Th_1$ and the channel decoder metric-based estimate is less than a second threshold value, implying an undesirable spike in the direct method of channel quality estimation. In all other situations, the selection process assigns confidence weights to the direct estimation result and the metric-based estimation result and use these weight factors to compute a final composite C/I estimate.

The C/I estimates from two methods in FIG. 2 are received in block 32 of the selection process in FIG. 3. C/I(direct) and C/I(metric) estimates from last N frames are kept in memory 34, 36. If the C/I estimate from the direct estimation method is greater than a first threshold (e.g., C/I(direct)>8 dB) in block 38 and the relative error weight metric based C/I estimate is less than a second threshold (e.g., C/I(metric)<3 dB) in block 40, then the confidence weighting factor, P, for the direct estimation method is set to zero and the C/I(metric) estimation method is used directly for AMR mode adaptation. A difference of this magnitude (e.g. (C/I(direct)−C/I(metric)>5 dB) implies that the higher C/I(direct) is a false spike in the direct estimation measurement and thus unreliable. This is shown in block 42 where the confidence factor for the C/I direct estimation method is set to zero and the confidence factor for the C/I decoder metric method is set to one.

If the C/I estimate from the direct method is greater than the first threshold and the C/I estimate from the metric based estimation method is greater than the second threshold, then the estimate from metric-based method is compared with the first threshold in block 44. If the C/I(metric) is greater than the first threshold, then C/I (direct) is assumed to be a reliable measure of channel quality and is used exclusively by assigning a confidence factor of 1 to C/I(direct) and assigning a confidence factor of 0 to C/I(metric), as shown in block 46.

In all other cases, C/I(direct) and C/I(metric) estimates are updated as shown in blocks 48, 50 in memory 34, 36. The C/I(direct) estimate and the C/I(metric) estimate are assigned confidence levels $P_{direct}$ and $P_{metric}$, respectively, depending upon each estimate's deviation from its respective average wherein $P_{direct}+P_{metric}=1$. $P_{direct}$ and $P_{metric}$ are computed as:

$$P_{direct} = 1 - \frac{\sigma_{direct}}{\sigma_{direct} + \sigma_{metrics}} = \frac{\sigma_{metrics}}{\sigma_{direct} + \sigma_{metrics}} \quad (2)$$

$$P_{metrics} = 1 - \frac{\sigma_{metrics}}{\sigma_{direct} + \sigma_{metrics}} = \frac{\sigma_{direct}}{\sigma_{direct} + \sigma_{metrics}}$$

where $\sigma_{direct}$ and $\sigma_{metrics}$ represent standard deviations of the previous NC/I estimates from the direct estimation method and the decoder metric-based estimation method, respectively, as computed in blocks 52, 54. Thus, $$\sigma^2_{direct} = \sum_{n=-(N-1)}^{0} [C/I_{direct}(n) - m_{direct}]^2 \quad (3)$$

$$\sigma^2_{metrics} = \sum_{n=-(N-1)}^{0} [C/I_{metrics}(n) - m_{metrics}]^2$$

where $\sigma^2$ represents the variance, $C/I_{direct}(n)$ represents the nth C/I estimate from the direct estimation method, and $C/I_{metrics}(n)$ represents the nth C/I estimate from the channel decoder metric-based estimation method (n=0 corresponds to the current estimate). $m_{direct}$ and $m_{metrics}$ represent the means (first moment) of the corresponding previous NC/I estimates.

The confidence levels $P_{direct}$ and $P_{metric}$ are computed in block 56 according to equation (2) using the results of blocks 52 and 54 (equation (3)). The final C/I estimate is the weighted sum of the two C/I estimates as shown in block 58:

$$C/I_{final}=(C/I_{direct}(0)\times P_{direct})+(C/I_{metrics}(0)\times P_{metrics}) \quad (4)$$

The result of equation (4) is then used as a measure of the channel quality in AMR mode adaptation.

FIGS. 4 and 5 show C/I ratios (after linearization/polynomial mapping and filtering) for a sample case of a TCH/AFS10.2 GSM channel with actual C/I=3 dB. FIG. 4 illustrates a direct estimation only C/I plot while FIG. 5 illustrates a combined and weighted C/I plot using both direct estimation and decoder metrics. As can be seen from the plots, the direct C and I energy estimation method may result in occasional false estimates, especially under degraded channel conditions. However, the combined estimation method of the present invention yields far superior results with respect to reliability and accuracy. The direct method C/I estimates in FIG. 4 are more dispersed ranging from 0 to over 15 dB while the combined method of C/I estimates in FIG. 5 are less dispersed ranging between 2.5 and 3.1 dB. Combining the two estimation methods therefore provides increased reliability to channel quality estimates.

While the present invention is described herein in the context of a mobile telephone, the term mobile telephone may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile telephones may also be referred to as "pervasive computing" devices.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word means.

The invention claimed is:

1. A method of combining a channel quality estimate for a radio channel based on a direct measurement of carrier and interferer energies, and a channel quality estimate for the radio channel based on channel decoder metrics, to obtain a better overall estimate of the carrier-to-interference (C/I) ratio measure of the channel quality for the radio channel, said method comprising: obtaining a direct channel quality estimate based on carrier and interferer energies;

obtaining a channel decoder metric based channel quality estimate;

computing a confidence level, P(direct), for the direct channel quality estimate, and a confidence level, P(metric), for the decoder metric channel quality estimate wherein, $0 \leq P(\text{direct}) \leq 1$, $0 \leq P(\text{metric}) \leq 1$, and $P(\text{direct}) + P(\text{metric}) = 1$;

multiplying P(direct) by the direct channel quality estimate and P(metric) by the decoder metric channel quality estimate; and adding the respective products to obtain a final channel quality estimate in terms of the carrier-to-interference (C/I) ratio for the radio channel.

2. The method of claim 1 further comprising:
storing the previous N direct channel quality estimates; and
storing the previous N decoder metric-based channel quality estimates.

3. The method of claim 2 wherein P(direct) is a function of the standard deviation $\sigma_{direct}$ of the previous N direct channel quality estimates, and the standard deviation $\sigma_{metric}$ of the previous N decoder metric-based channel quality estimates, wherein P(direct) is equal to $\sigma_{metric}/(\sigma_{direct} + \sigma_{metric})$.

4. The method of claim 2 wherein P(metric) is a function of the standard deviation $\sigma_{direct}$ of the previous N direct channel quality estimates, and the standard deviation $\sigma_{metric}$ of the previous N decoder metric-based channel quality estimates, wherein P(metric) is equal to $\sigma_{direct}/(\sigma_{direct} + \sigma_{metric})$.

5. The method of claim 1 wherein P(direct) is set to 0 when C/I(direct) is significantly greater than C/I(metric).

6. The method of claim 1 wherein P(metric) is set to 0 when both C/I(metric) and C/I(direct) are greater than a first threshold.

7. The method of claim 1 wherein the final channel quality estimate is used for adaptive multi-rate (AMR) codec mode adaptation.

8. A system for combining a channel quality estimate for a radio channel based on a direct measurement of carrier and interferer energies, and a channel quality estimate for the radio channel based on channel decoder metrics, to obtain a better overall estimate of the carrier-to-interference (C/I) ratio measure of the channel quality for the radio channel, said system comprising:

means for obtaining a direct channel quality estimate based on carrier and interferer energies;

means for obtaining a channel decoder metric based channel quality estimate;

means for computing a confidence level, P(direct), for the direct channel quality estimate, and a confidence level, P(metric), for the decoder metric channel quality estimate wherein, $0 \leq P(\text{direct}) \leq 1$, $0 \leq P(\text{metric}) \leq 1$, and $P(\text{direct}) + P(\text{metric}) = 1$;

means for multiplying P(direct) by the direct channel quality estimate and P (metric) by the decoder metric channel quality estimate; and means for adding the respective products to obtain a final channel quality estimate in terms of the carrier-to-interference (C/I) ratio for the radio channel.

9. The system of claim 8 further comprising:
means for storing the previous N direct channel quality estimates; and
means for storing the previous N decoder metric-based channel quality estimates.

10. The system of claim 9 further comprising means for computing P(direct) as a function of the standard deviation $\sigma_{direct}$ of the previous N direct channel quality estimates, and the standard deviation $\sigma_{metric}$ of the previous N decoder metric-based channel quality estimates, wherein P(direct) is equal to $\sigma_{metric}/(\sigma_{direct}+\sigma_{metric})$.

11. The system of claim 9 further comprising means for computing P(direct) as a function of the standard deviation $\sigma_{direct}$ of the previous N direct channel quality estimates, and the standard deviation $\sigma_{metric}$ of the previous N decoder metric-based channel quality estimates, wherein P(metric) is equal to $\sigma_{direct}/(\sigma_{direct}+\sigma_{metric})$.

12. The system of claim 8 further comprising means for setting P(direct) to 0 when C/I(direct) is significantly greater than C/I (metric).

13. The system of claim 8 further comprising means for setting P(metric) to 0 when both C/I(metric) and C/I(direct) are greater than a first threshold.

14. The system of claim 8 wherein the final channel quality estimate is used for adaptive multi-rate (AMR) codec mode adaptation.

* * * * *